US012768851B2

(12) United States Patent
Tropmann

(10) Patent No.: US 12,768,851 B2
(45) Date of Patent: Oct. 20, 2026

(54) LABORATORY APPARATUS, LABORATORY SAMPLE HANDLING SYSTEM AND USE OF A LABORATORY APPARATUS AND/OR A LABORATORY SAMPLE HANDLING SYSTEM

(71) Applicant: Roche Diagnostics Operations, Inc., Indianapolis, IN (US)

(72) Inventor: Artur Tropmann, Ditzingen (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 635 days.

(21) Appl. No.: 18/347,647

(22) Filed: Jul. 6, 2023

(65) Prior Publication Data

US 2024/0019453 A1 Jan. 18, 2024

(51) Int. Cl.

| | |
|---|---|
| ***B08B 6/00*** | (2006.01) |
| ***B01L 9/06*** | (2006.01) |
| ***B67B 7/14*** | (2006.01) |
| ***B67B 7/18*** | (2006.01) |
| ***G01N 35/02*** | (2006.01) |
| ***G01N 35/04*** | (2006.01) |

(52) U.S. Cl.

CPC ................ *G01N 35/02* (2013.01); *B01L 9/06* (2013.01); *G01N 35/04* (2013.01); *G01N 2035/0405* (2013.01); *G01N 2035/0496* (2013.01)

(58) Field of Classification Search

None

See application file for complete search history.

(56) References Cited

U.S. PATENT DOCUMENTS

| | | | | |
|---|---|---|---|---|
| 2002/0092366 | A1* | 7/2002 | Brock | B01L 3/0268 436/180 |
| 2005/0158704 | A1* | 7/2005 | Tyvoll | A61B 5/14532 435/4 |
| 2016/0336196 | A1* | 11/2016 | Sim | B08B 6/00 |
| 2017/0166428 | A1 | 6/2017 | Enoki et al. | |
| 2019/0039869 | A1* | 2/2019 | Strzempek | B67B 7/02 |

FOREIGN PATENT DOCUMENTS

| | | | | |
|---|---|---|---|---|
| KR | 101593063 B1 * | 2/2016 | | E03D 9/05 |
| WO | 2012/112505 A2 | 8/2012 | | |
| WO | 2017/182353 A1 | 10/2017 | | |

OTHER PUBLICATIONS

European Search Report issued Dec. 7, 2022, in Application No. 22184966.4, 2 pp.

* cited by examiner

*Primary Examiner* — Tanzim Imam

(74) *Attorney, Agent, or Firm* — Thomas E. Lees, LLC

(57) ABSTRACT

A laboratory apparatus for use in a laboratory sample handling system, wherein the apparatus comprises a cap waste disposal catcher, wherein the catcher is designed to catch a laboratory cap removed from a laboratory sample container containing a laboratory sample, and an electric field generator, wherein the generator is designed to generate an electric field to attract a residue of the sample released by the cap to the catcher.

23 Claims, 4 Drawing Sheets

LABORATORY APPARATUS, LABORATORY SAMPLE HANDLING SYSTEM AND USE OF A LABORATORY APPARATUS AND/OR A LABORATORY SAMPLE HANDLING SYSTEM

CROSS-REFERENCE TO RELATED APPLICATIONS

This application claims priority to European Patent Application No. 22184966.4, filed 14 Jul. 2022, the disclosure of which is hereby incorporated by reference in its entirety.

TECHNICAL FIELD

The disclosure relates to a laboratory apparatus for use in a laboratory sample handling system, a laboratory sample handling system comprising such a laboratory apparatus and a use of such a laboratory apparatus in, in particular such, a laboratory sample handling system and/or of such a laboratory sample handling system.

SUMMARY

Although the embodiments of the present disclosure are not limited to specific advantages or functionality, it is noted that in accordance with the present disclosure, a laboratory apparatus and a use of such a laboratory apparatus in a laboratory sample handling system and/or a laboratory sample handling system are provided that comprises a cap waste disposal catcher and an electric field generator. The catcher is designed to catch a laboratory cap removed from a laboratory sample container containing a laboratory sample. The generator is designed to generate an electric field to, in particular electrically, attract a residue of the sample released by the cap to the catcher.

In accordance with an embodiment of the present disclosure, a laboratory apparatus for use in a laboratory sample handling system is provided, wherein the apparatus comprises: a cap waste disposal catcher, wherein the catcher is designed to catch a laboratory cap removed from a laboratory sample container containing a laboratory sample, and an electric field generator, wherein the generator is designed to generate an electric field to attract a residue of the sample released by the cap to the catcher.

In accordance with another embodiment of the present disclosure, a laboratory sample handling system is provided, wherein the system comprises: a decapper, wherein the decapper is designed to remove a laboratory cap from a laboratory sample container containing a laboratory sample, and a laboratory apparatus according to an embodiment of the present disclosure.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
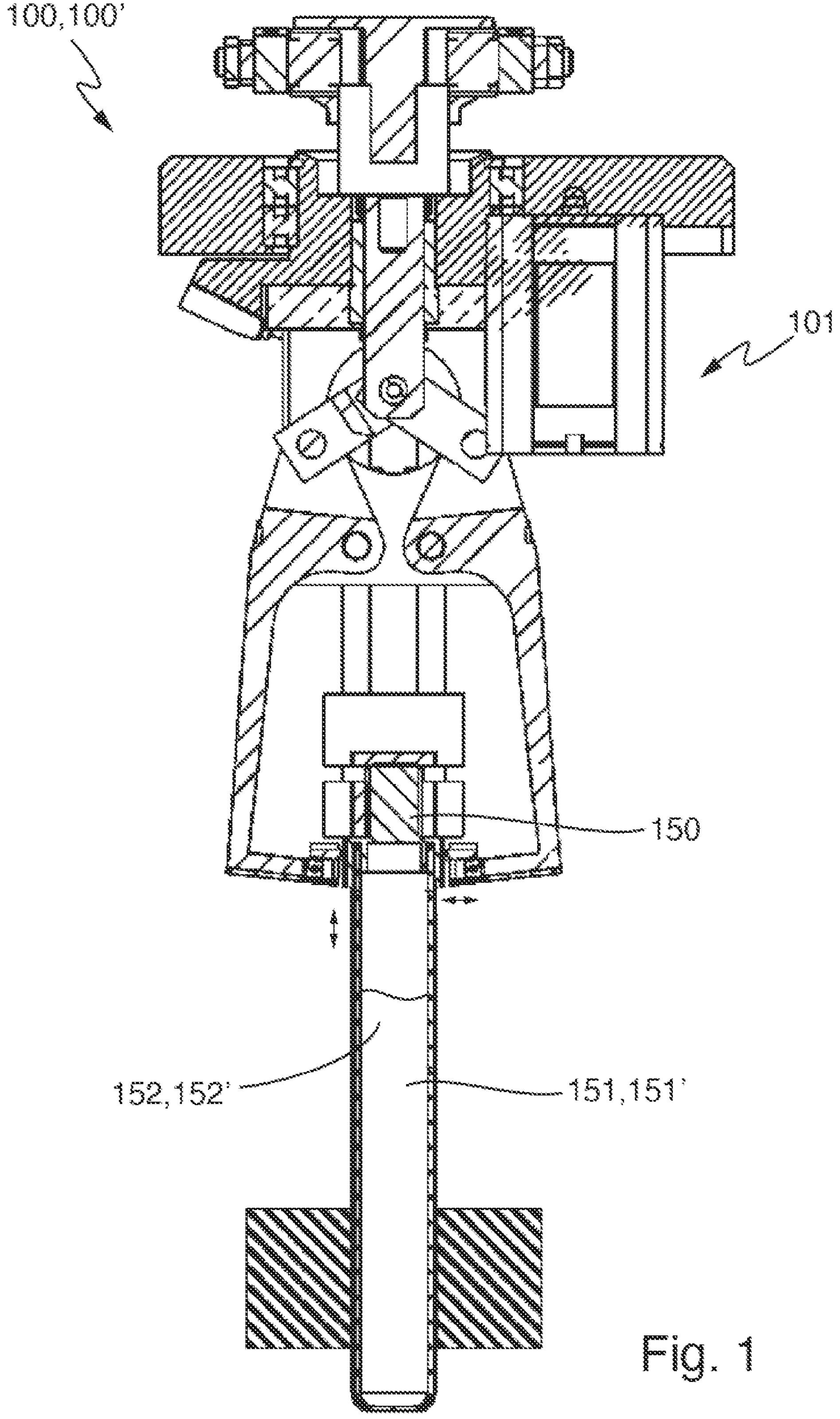
FIG. 1 shows a view of a decapper of a laboratory sample handling system according to the disclosure removing a laboratory cap from a laboratory sample container containing a laboratory sample and a use of the system in accordance with an embodiment of the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure

DETAILED DESCRIPTION

In particular after the, in particular automated, removal of the cap from the container or decapping process, respectively, the cap may be dropped and/or fall down, in particular due to gravity, to the catcher. The cap, in particular an inner side of the cap, may be contaminated or polluted or coated, in particular wetted, respectively, from the sample in case the container has been tilted prior to the decapping process. During and/or due to an impact of the cap onto a, in particular rigid or solid, respectively, surface of the catcher, the cap may rotate chaotically and uncontrollably. Thereby, this can lead to the release or detachment, respectively, of the residue of the sample, in particular at least one small, in particular micro, droplet, from the cap.

This, in particular the generator, enables to reduce or to mitigate, respectively, or to prevent or to avoid, respectively, a, in particular uncontrolled, spilling or splashing, respectively, of the residue, in particular from or out of, respectively, the catcher and/or when the cap is caught. This enables to reduce or to prevent a contamination, in particular a cross-contamination, of the container and/or the sample and/or other laboratory sample containers and/or other laboratory samples. Thus, the properties of the laboratory apparatus are improved and it may cause fewer or no problems in a laboratory environment than a laboratory apparatus without such an electric field generator.

In particular, the term "pre-analytical" may be used synonymously for the term "handling".

The term "has/having" may be used synonymously for the term "comprises/comprising".

The term "configured" or "adapted" may be used synonymously for the term "designed".

The container may be made of glass or plastic or any other, in particular somewhat, solid material. Additionally or alternatively, the container may be designed as a tube. Additionally or alternatively, the container may comprise an opening, in particular at a top or upper end. In particular, the opening may be defined by an end of a wall and/or a circumference of the container. Additionally or alternatively, the container or its opening, respectively, may be open or closed, in particular by the cap.

The cap may be different from the container. Additionally or alternatively, the cap may comprise rubber and/or plastic or may completely consist of rubber and/or plastic. Additionally or alternatively, the cap may comprise a cylindrical shape, in particular with a circular cross section. Additionally or alternatively, the cap may be designed as a lid, in particular a rigid lid, or as a foil, in particular a flexible foil.

The container and/or the cap may comprise/s means of attaching to each other with sufficient security, e.g., threads, locks and/or adhesives may be used.

The term "cap receiver" may be used synonymously for the term "catcher".

The generator may be different from the catcher.

The term "produce" or "develop" may be used synonymously for the term "generate".

The term "capture", "confine" or "retain" may be used synonymously for the term "attract".

The term "droplet" may be used synonymously for the term "residue".

The term "transmitted" or "detached" may be used synonymously for the term "released".

The term "from" may be used synonymously for the term "by".

The term "towards" or "into" may be used synonymously for the term "to".

According to an embodiment of the disclosure, the laboratory apparatus is for use in a laboratory liquid, in particular aqueous, sample handling system. The catcher is designed to catch the cap removed from a laboratory liquid, in particular aqueous, sample container containing a laboratory liquid, in particular aqueous, sample. The generator is designed to generate the field to attract a liquid, in particular aqueous, residue of the sample released by the cap to the catcher. In particular, the sample may be a biological liquid or fluid, respectively, in particular a blood sample, an urine sample, an excrement, an interstitial fluid or a lymph. Additionally or alternatively, the term "fluid" may be used synonymously for the term "liquid". Additionally or alternatively, the term "hydrous" may be used synonymously for the term "aqueous".

In particular, the generator may be designed to be, in particular electrically, powered, in particular to generate the field.

According to an embodiment of the disclosure, the generator comprises, in particular is, an electrostatic generator. The generator is designed to generate an electrostatic field to electrostatically attract the residue. This enables to electrically polarize the, in particular uncharged or electrically neutral, respectively, and/or aqueous residue especially well and/or, in particular thus, the residue to be attracted especially well. In particular, the electrostatic generator may be a friction machine, in particular using the triboelectric effect, or an influence machine, in particular using electrostatic induction. Additionally or alternatively, the electrostatic generator may be designed to develop a, in particular electric, charge, in particular to generate the electrostatic field.

In particular, the generator may comprise at least one electrode. The electrode may be designed to be, in particular electrically, charged, in particular to generate the field.

According to an embodiment of the disclosure, at least a part of the generator, in particular at least one electrode of the generator designed to be, in particular electrically, charged, in particular to generate the field, is arranged at a, in particular inner, surface of the catcher. Additionally or alternatively, the generator is designed to develop a, in particular electric, charge, in particular to generate the field, at a, in particular inner, surface of the catcher. Additionally or alternatively, the generator is designed to generate the field at least at a, in particular inner, surface of the catcher. Additionally or alternatively, the generator is designed to generate the field to attract the residue to a, in particular inner, surface of the catcher. This enables to reduce or to prevent a spilling of the residue from the catcher especially well. In particular, arranged may be spatially arranged. Additionally or alternatively, the term "inside" or "internal" may be used synonymously for the term "inner". Additionally or alternatively, the surface may be flat. Additionally or alternatively, the catcher may be designed to catch the cap by its, in particular inner, surface.

In particular a, in particular inner, surface of the catcher may at least partially or completely consist of a conductive, in particular metallic, material.

At least a part of a, in particular inner, surface of the catcher designed to be exposed to the residue may be hydrophobic.

According to an embodiment of the disclosure, the laboratory apparatus is for use in a laboratory liquid sample handling system. The catcher comprises a, in particular inner, surface. In particular, at least a part of, the surface is designed to be exposed to at least one impacting droplet of a laboratory liquid sample and is, in particular topologically, heterogeneously patterned to originate a heterogeneous flow velocity, in particular distribution, within the impacted droplet on the surface for reducing a rebound energy of the droplet, in particular from the surface. This enables to control or regulate, respectively, a force transmission of the droplet. This enables to reduce or to prevent a spilling of the residue from the catcher especially well. In particular, the surface may be flat. Additionally or alternatively, the phrase "in contact with" may be used synonymously for the phrase "exposed to". Additionally or alternatively, the term "impinging" may be used synonymously for the term "impacting". Additionally or alternatively, the term "create" may be used synonymously for the term "originate". Additionally or alternatively, the term "along" may be used synonymously for the term "on". Additionally or alternatively, the catcher may be designed to catch the cap removed from a laboratory liquid sample container containing a laboratory liquid sample.

These features, in particular alone, may be a, in particular own, disclosure. In other words:

Laboratory device for use in a, in particular the, laboratory liquid sample handling system, wherein the device comprises:

a, in particular the and/or inner, surface, wherein, in particular at least a part of, the surface is designed to be exposed to at least one impacting droplet of a laboratory liquid sample and is heterogeneously patterned to originate a heterogeneous flow velocity within the impacted droplet on the surface for reducing a rebound energy of the droplet.

In particular, the device may be a, in particular the, cap waste disposal catcher. The catcher may comprise the surface and be designed to catch a laboratory cap removed from a laboratory liquid sample container containing a laboratory liquid sample by its surface. In particular, the droplet may be released by the cap. Additionally or alternatively, the device may be without an electric field generator.

According to an embodiment of the disclosure, the surface comprises a heterogeneously patterned, in particular chemical, wettability. This enables to originate the heterogeneous flow velocity especially well.

According to an embodiment of the disclosure, the catcher or the device comprises a low-adhesive, in particular hydrophobic, substrate comprising at least one high-adhesive, in particular hydrophilic, pattern. This enables the heterogeneously patterned wettability of the surface especially well. In particular, the substrate may at least partially or completely consist of alumina surface-modified with 1H, 1H, 2H, 2H-perfluorodecyltrimethoxysilane (PFOTS) and exposed to UV-light patternedly. Additionally or alternatively, hydrophobic may be super-hydrophobic and/or hydrophilic may be super-hydrophilic. Additionally or alternatively, hydrophobic and/or hydrophilic may be determined by static and/or dynamic, in particular advancing and/or receding, contact angle water measurement/s. In particular, hydrophobic may mean a contact angle of minimal 120° (degree), in particular minimal 150°. Additionally or alternatively, hydrophilic may mean a contact angle of maximal 60°, in particular maximal 30°, in particular maximal 15°.

In particular, the surface may be chemically and/or physically treated and/or structured to be heterogeneously patterned. In particular, the chemically treated surface may be a macroscopically smooth surface. Additionally or alternatively, the physically treated surface may be fine-structured, in particular nano-structured.

According to an embodiment of the disclosure, the surface is heterogeneously patterned to convert a translation of the impacting droplet at least partially or completely to a deflection, a rolling and/or a rotation, in particular a gyration, of the impacted droplet on the surface. This enables to reduce a rebound energy of the droplet especially well. Additionally or alternatively, this, in particular the gyration or an angular momentum, respectively, may be enabled or formed, respectively, by a synergistic effect of asymmetric adhesion or pinning, respectively, forces, in particular accumulated during droplet or liquid film, respectively, retraction, originated from or induced by, respectively, the surface heterogeneity and an excess surface energy of the spreading droplet after impact. In particular, the phrase "translational motion" may be used synonymously for the term "translation". Additionally or alternatively, the phrase "deflected translational motion" may be used synonymously for the term "deflection". Additionally or alternatively, the phrase "gyration motion" may be used synonymously for the term "gyration". Additionally or alternatively, the droplet may gyrate clockwise by impacting on a dextrorotary high-adhesive pattern or anticlockwise by impacting on a levorotary high-adhesive pattern.

According to an embodiment of the disclosure, the catcher or the device comprises an input end and an opposite, in particular output, end. The surface is heterogeneously patterned to convert the translation at least partially or completely to the deflection in a direction from the input end to the opposite end. This enables to reduce or to prevent a spilling of the residue in an undesired direction. In particular, the term "entrance" may be used synonymously for the term "input". Additionally or alternatively, the term "exit" may be used synonymously for the term "output". Additionally or alternatively, the opposite end may be arranged, in particular vertically, below the input end. This may further enable the residue and/or the cap to slide down or downwards, respectively, in particular due to gravity, in particular from the input end to the opposite end. Additionally or alternatively, a cap waste disposal compartment, in particular a bucket, may be arranged at the opposite end.

According to an embodiment of the disclosure, the heterogeneously patterned surface comprises at least one pattern, in particular several patterns each, comprising a rotation symmetry and no mirror symmetry, and/or a mirror symmetry and no rotation symmetry, and/or no rotation symmetry and no mirror symmetry. The rotation symmetry and no mirror symmetry enable the gyration. Additionally or alternatively, the mirror symmetry and no rotation symmetry enable the deflection and the rolling. Additionally or alternatively, no rotation symmetry and no mirror symmetry enable the gyration, the deflection and the rolling. In particular, the term "asymmetric" may be used synonymously for the phrase "no rotation symmetry and no mirror symmetry". Additionally or alternatively, the rotation symmetry may be about a rotation axis orthogonal to a surface plane of the surface. Additionally or alternatively, the mirror symmetry may be about a mirror plane orthogonal to the surface plane of the surface.

According to an embodiment of the disclosure, the pattern comprises at least one arc, in particular an open circular arc, and/or a, in particular open and/or Archimedean, spiral segment, in particular forming a spiral. In particular, the pattern comprises two to ten, in particular four, arcs. Additionally or alternatively, the open circular arcs forming the spiral may enable the rotation symmetry and no mirror symmetry. Additionally or alternatively, the term "pinwheel" may be used synonymously for the term "spiral". Additionally or alternatively, the at least one circular arc, in particular the circular arcs, may be open and/or concave to the input end and/or closed and/or convex to the opposite end. This may enable the mirror symmetry and no rotation symmetry. Additionally or alternatively, the open circular arc may be a half-circle. Additionally or alternatively, the open and Archimedean spiral segment may enable no rotation symmetry and no mirror symmetry. Additionally or alternatively, the arc may be an arc shape and/or the spiral segment may be a spiral segment shape. Additionally or alternatively, the term "design" may be used synonymously for the term "shape".

In particular, the heterogeneously patterned surface may comprise at least one pattern, in particular several patterns each, comprising an extension or a size, respectively, in particular a diameter, of minimal 1 mm (millimeter) and/or maximal 20 mm. This may enable the pattern extension to be commensurate, in particular equal, with that of the, in particular impacted and/or maximum spreaded, droplet.

The catcher may comprise a cap catching or input, respectively, area or region, respectively, and be designed to catch the cap in or by, respectively, its catching area. The generator may be designed to generate the field at least in the catching area.

According to an embodiment of the disclosure, the catcher comprises, in particular is, a cap waste disposal chute. In particular, the chute is designed to guide the cap and/or the residue away, in particular to a cap waste disposal compartment, in particular a bucket. In particular, the term “funnel” or “duct” may be used synonymously for the term “chute”. Additionally or alternatively, the term “convey” or “pass” may be used synonymously for the term “guide”. Additionally or alternatively, an opening of the chute may comprise, in particular be, the catching area.

The disclosure further relates to a, in particular the, laboratory sample handling system. The system comprises a decapper and a, in particular the, laboratory apparatus according to the disclosure or as described above, respectively. The decapper is designed to remove a, in particular the, laboratory cap from a, in particular the, laboratory sample container containing a, in particular the, laboratory sample. This enables the container or its opening, respectively, to be opened, in particular which may be required by some types of instruments and/or analysis and/or for the sample. In particular, the decapper may be different from the catcher. Additionally or alternatively, the decapper may comprise a cap gripper and a container holder. The gripper may be designed to grip the cap. The holder may be designed to hold the container. The gripper and the holder may be moveable, in particular displaceable and/or rotatable, relatively to each other to remove the, in particular gripped, cap from the, in particular held, container. In particular, the gripper may be arranged, in particular vertically, above the holder such that, in particular after the removal of the cap, the opening of the container may be, in particular vertically, above the rest of the container. This may enable the sample to stay in the container.

According to an embodiment of the disclosure, the decapper is designed to drop the removed cap to the catcher. In particular, the decapper, in particular its gripper, may be arranged, in particular vertically, above the catcher, in particular such that, in particular after the release of the cap by the decapper, the cap may fall down, in particular due to gravity.

The disclosure further relates to a use of a, in particular the, laboratory apparatus in a, in particular the, laboratory sample handling system and/or of a, in particular the, laboratory sample handling system according to the disclosure or as described above, respectively, for catching a, in particular the, laboratory cap removed from a, in particular the, laboratory sample container containing a, in particular the, laboratory sample and for generating an, in particular the, electric field to attract a, in particular the, residue of the sample released by the cap to the catcher.

Additionally or alternatively, the disclosure further relates to a use of a, in particular the, laboratory device in a, in particular the, laboratory liquid sample handling system according to the disclosure or as described above, respectively, for exposing, in particular at least a part of, the surface heterogeneously patterned to at least one impacting droplet of a, in particular the, laboratory liquid sample to originate a, in particular the, heterogeneous flow velocity within the impacted droplet on the surface for reducing a, in particular the, rebound energy of the droplet.

In order that the embodiments of the present disclosure may be more readily understood, reference is made to the following examples, which are intended to illustrate the disclosure, but not limit the scope thereof.

Figure 2:
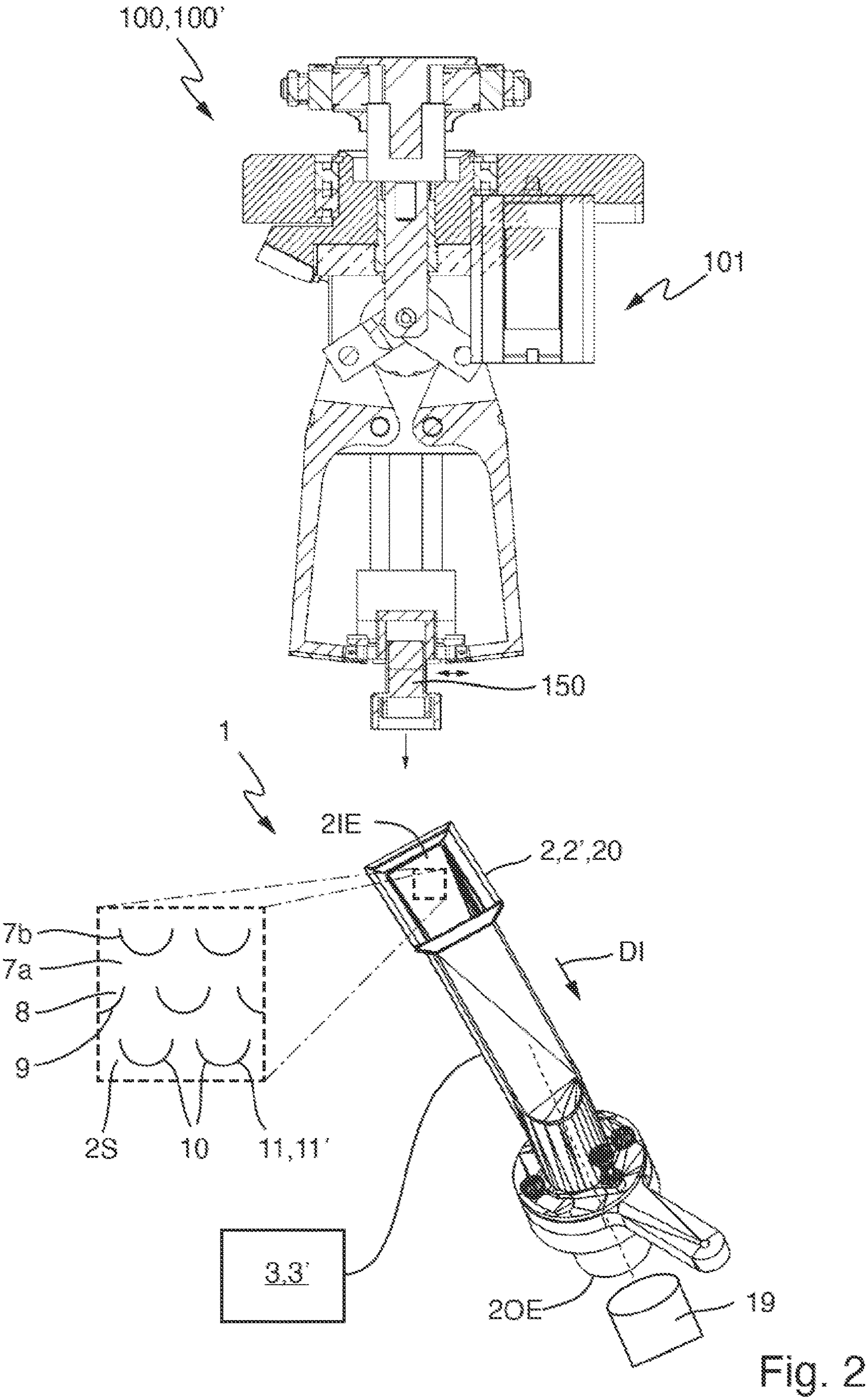
FIG. 2 shows a view of the system of FIG. 1 comprising a laboratory apparatus or a laboratory device according to the disclosure comprising or being a cap waste disposal catcher and an electric field generator and the catcher or the device comprising a heterogeneously patterned surface and the decapper dropping the removed cap to the catcher and the use in accordance with an embodiment of the present disclosure.
Figure 3:
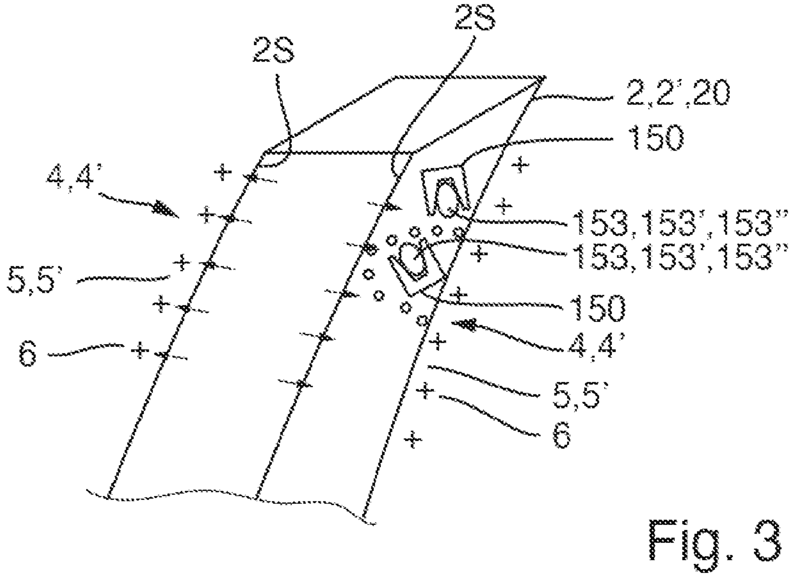
FIG. 3 shows the catcher of FIG. 2 catching the removed and dropped cap and an electric field generated by the generator of FIG. 2 attracting a residue of the sample released by the cap to the catcher and a use of the catcher according to the disclosure in accordance with an embodiment of the present disclosure.

FIGS. 1 and 2 show a laboratory, in particular liquid, in particular aqueous, sample handling system 100, 100' and a use of the system 100. The system 100 comprises a decapper 101 and a laboratory apparatus 1 or a laboratory device 20.

The decapper 101 is designed to, in particular automatically, remove a laboratory cap 150 from a laboratory, in particular liquid, in particular aqueous, sample container 151, 151' containing a laboratory, in particular liquid, in particular aqueous, sample 152, 152', in particular removes.

The laboratory apparatus 1 for a use in the laboratory, in particular liquid, in particular aqueous, sample handling system 100, 100' comprises a cap waste disposal catcher 2, as shown in FIGS. 3 to 6, and an electric field generator 3.

The decapper 101 is designed to, in particular automatically, drop the removed cap 150 to the catcher 2, in particular drops.

The catcher 2 is designed to catch the laboratory cap 150 removed from the laboratory, in particular liquid, in particular aqueous, sample container 151, 151' containing the laboratory, in particular liquid, in particular aqueous, sample 152, 152', in particular catches.

The generator 3 is designed to, in particular automatically, generate an electric field 4 to attract a, in particular liquid, in particular aqueous, residue 153, 153' of the sample 152, 152' released by the cap 150 to the catcher 2, in particular generates and, thus, attracts.

In detail the generator 3 comprises, in particular is, an electrostatic generator 3'. The generator 3 is designed to generate an electrostatic field 4' to electrostatically attract the residue 153.

Furthermore, at least a part 5 of the generator 3, in particular at least one electrode 5' of the generator 3 designed to be charged, in particular being charged, is arranged at a, in particular inner, surface 2S of the catcher 2.

Additionally or alternatively, the generator 3 is designed to, in particular automatically, develop a charge 6 at the a, in particular inner, surface 2S of the catcher 2, in particular develops.

Additionally or alternatively, the generator 3 is designed to generate the field 4 at least at the, in particular inner, surface 2S of the catcher 2.

Additionally or alternatively, the generator 3 is designed to generate the field 4 to attract the residue 153 to the, in particular inner, surface 2S of the catcher 2.

In the shown embodiment the charge 6 is positive. In alternative embodiments the charge may be negative.

Moreover, the catcher 2 is designed to catch the cap 150 by its surface 2S.

Further, the catcher 2 or the device 20 for a use in the laboratory liquid sample handling system 100' comprises the, in particular inner, surface 2S. The surface 2S is designed to be exposed to at least one impacting droplet 153" of the laboratory liquid sample 152' and is heterogeneously patterned to originate a heterogeneous flow velocity within the impacted droplet 153" on the surface 2S for reducing a rebound energy of the droplet 153", in particular is exposed and, thus, originates and, thus, reduces.

In detail the surface 2S comprises a heterogeneously patterned wettability 7_a_, 7_b_.

In detail the catcher 2 or the device 20 comprises a low-adhesive, in particular hydrophobic, substrate 8 comprising at least one high-adhesive, in particular hydrophilic, pattern 9.

Furthermore, surface 2S is heterogeneously patterned to convert a translation TM of the impacting droplet 153" at least partially to a deflection DF, a rolling RL and/or a rotation RO, in particular a gyration GY, of the impacted droplet 153" on the surface 2S, in particular converts.

In detail the catcher 2 or the device 20 comprises an input end 21E and an opposite, in particular output, end 20E. The surface 2S is heterogeneously patterned to convert the translation TM at least partially to the deflection DF in a direction DI from the input end 21E to the opposite end 20E.

Moreover, the heterogeneously patterned surface 2S comprises at least one pattern 10, in particular several patterns 10 each, comprising a rotation symmetry RS and no mirror symmetry MS, and/or a mirror symmetry MS and no rotation symmetry RS, and/or no rotation symmetry RS and no mirror symmetry MS.

In detail the pattern 10 comprises at least one arc 11, in particular an open circular arc 11', and/or a, in particular open and/or Archimedean, spiral segment 11", in particular forming a spiral 11'".

Figure 4:
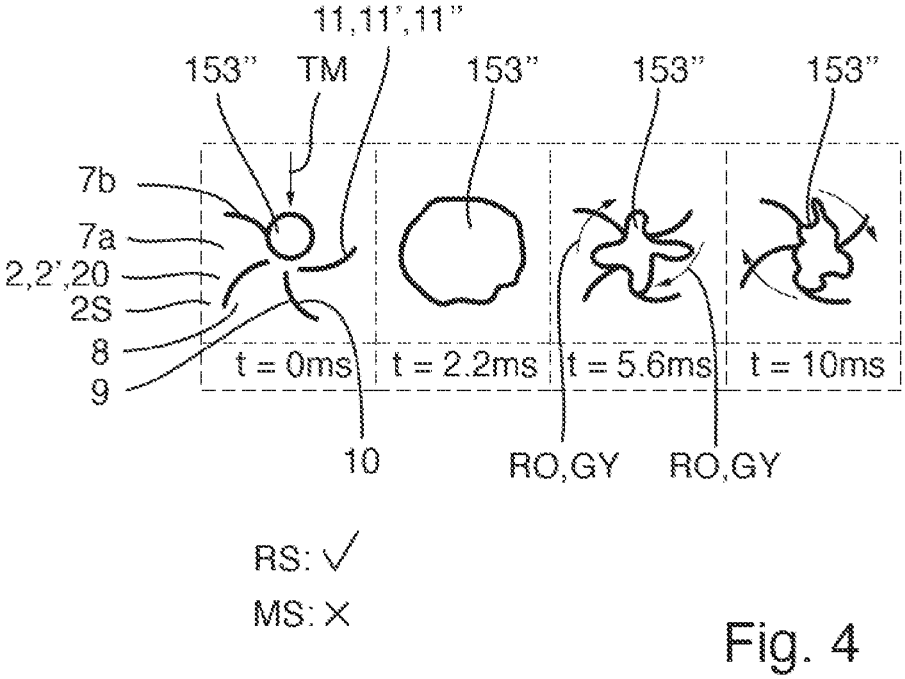
FIG. 4 shows a droplet of the sample impacting and impacted on a differently heterogeneously patterned surface of the catcher or the device of FIG. 2 comprising arcs forming a spiral comprising a rotation symmetry and no mirror symmetry and a use of the catcher or the device according to the disclosure in accordance with an embodiment of the present disclosure.

In FIG. 4 the translation TM of the impacting droplet 153" is converted to the gyration GY of the impacted droplet 153" on the low-adhesive substrate 8 comprising the at least one high-adhesive pattern 9, 10 comprising the open circular arcs 11' forming the spiral 11'" comprising the rotation symmetry RS and no mirror symmetry MS. In particular, during a spreading stage, a translational kinetic energy is converted to a surface energy of the droplet 153". After reaching maximum spreading and forming a circular film, the liquid or droplet 153", respectively, heterogeneously recedes, in particular on the low-adhesive substrate 8 faster than on the high-adhesive pattern 9, 10, thus, rotating, in particular gyrating. In other words: the surface energy is converted to a rotational kinetic energy.

Figure 5:
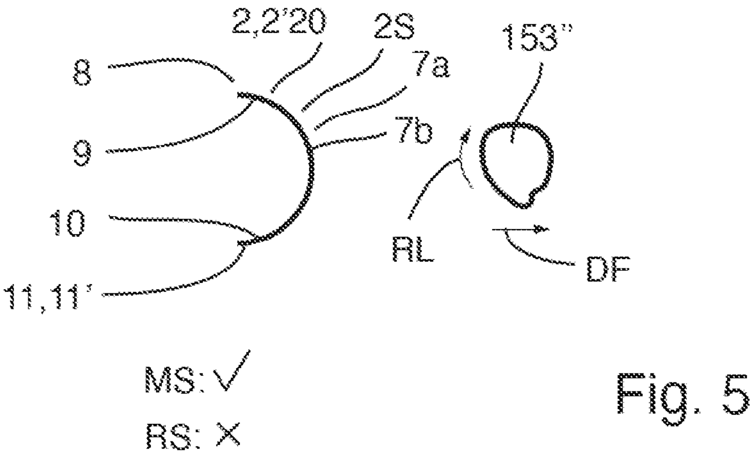
FIG. 5 shows a droplet of the sample impacted on the surface of the catcher or the device of FIG. 2 comprising at least one arc comprising a mirror symmetry and no rotation symmetry and a use of the catcher or the device in accordance with an embodiment of the present disclosure.

In FIG. 5 the translation TM of the impacting droplet 153" is converted to the deflection DF and the rolling RL of the impacted droplet 153" on the low-adhesive substrate 8 comprising the at least one high-adhesive pattern 9, 10 comprising the circular arcs 11' open to the input end 21E and/or closed to the opposite end 20E comprising the mirror symmetry MS and no rotation symmetry RS.

Figure 6:
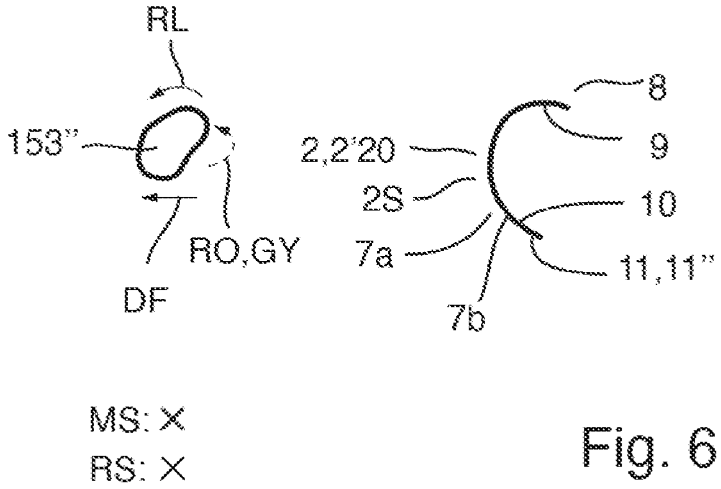
FIG. 6 shows a droplet of the sample impacted on a differently heterogeneously patterned surface of the catcher or the device of FIG. 2 comprising at least one Archimedean spiral segment comprising no rotation symmetry and no mirror symmetry and a use of the catcher or the device in accordance with an embodiment of the present disclosure.

In FIG. 6 the translation TM of the impacting droplet 153" is converted to the deflection DF, the rolling RL and/or the gyration GY of the impacted droplet 153" on the low-adhesive substrate 8 comprising the at least one high-adhesive pattern 9, 10 comprising the open Archimedean spiral segment 11" comprising no rotation symmetry RS and no mirror symmetry MS.

Further, the catcher 2 comprises, in particular is, a cap waste disposal chute 2'. In particular the chute 2' is designed to guide the cap 150 and/or the residue 153 away, in particular to a cap waste disposal compartment 19, in particular guides.

As the shown and above-described embodiments reveal, the disclosure provides a laboratory apparatus having improved properties. Furthermore, the disclosure provides a laboratory sample handling system comprising such a laboratory apparatus and a use of such a laboratory apparatus in, in particular such, a laboratory sample handling system and/or of such a laboratory sample handling system.

What is claimed is:

1. A laboratory apparatus for use in a laboratory liquid sample handling system, wherein the apparatus comprises:

a cap waste disposal catcher, wherein the catcher is designed to catch a laboratory cap removed from a laboratory liquid sample container containing a laboratory liquid sample, wherein the catcher comprises a surface that is designed to be exposed to at least one impacting droplet of the laboratory liquid sample and that is heterogeneously patterned to originate a heterogeneous flow velocity within the at least one impacting droplet on the surface for reducing a rebound energy of the at least one impacting droplet.

2. The laboratory apparatus according to claim 1, further comprising an electric field generator, wherein the generator is designed to generate an electric field to attract a residue of the laboratory liquid sample released by the cap to the catcher.

3. The laboratory apparatus according to claim 2, wherein the residue is a liquid residue.

4. The laboratory apparatus according to claim 3, wherein the laboratory liquid sample handling system is configured to handle aqueous laboratory liquids, and wherein the laboratory liquid sample container is configured to hold an aqueous laboratory liquid sample.

5. The laboratory apparatus according to claim 2, wherein the generator is designed to generate an electrostatic field to electrostatically attract the residue.

6. The laboratory apparatus according to claim 5, wherein the generator is an electrostatic generator.

7. The laboratory apparatus according to claim 5, wherein at least a part of the generator is arranged at the surface of the catcher, and/or wherein the generator is designed to develop a charge at the surface of the catcher, and/or wherein the generator is designed to generate the field at least at the surface of the catcher, and/or wherein the generator is designed to generate the field to attract the residue to the surface of the catcher.

8. The laboratory apparatus according to claim 7, wherein the surface is an inner surface of the catcher.

9. The laboratory apparatus according to claim 1, wherein the surface comprises a heterogeneously patterned wettability.

10. The laboratory apparatus according to claim 9, wherein the catcher comprises a low-adhesive substrate comprising at least one high-adhesive pattern.

11. The laboratory apparatus according to claim 10, wherein the low-adhesive substrate is hydrophobic and the at least one high-adhesive pattern is hydrophilic.

12. The laboratory apparatus according to claim 1, wherein the surface is heterogeneously patterned to convert a translation of the at least one impacting droplet at least partially to a deflection, a rolling and/or a rotation of the at least one impacting droplet on the surface.

13. The laboratory apparatus according to claim 12, wherein the rotation is a gyration.

14. The laboratory apparatus according to claim 12, wherein the catcher comprises an input end and an opposite end, and wherein the surface is heterogeneously patterned to convert the translation at least partially to the deflection in a direction from the input end to the opposite end.

15. The laboratory apparatus according to claim 14, wherein the opposite end is an output end.

16. The laboratory apparatus according to claim 1, wherein the heterogeneously patterned surface comprises a pattern comprising (i) a rotation symmetry and no mirror symmetry, (ii) a mirror symmetry and no rotation symmetry or (iii) no rotation symmetry and no mirror symmetry.

17. The laboratory apparatus according to claim 16, wherein the heterogeneously patterned surface comprises several patterns.

18. The laboratory apparatus according to claim 16, wherein the pattern comprises at least one arc and/or a spiral segment.

19. The laboratory apparatus according to claim 18, wherein the at least one arc is an open circular arc and the spiral segment is an open and/or Archimedean spiral segment configured to form a spiral.

20. The laboratory apparatus according to claim 2, wherein the catcher comprises a cap waste disposal chute.

21. The laboratory apparatus according to claim 20, wherein the cap waste disposal chute is designed to guide the cap and/or the residue away to a cap waste disposal compartment.

22. A laboratory sample handling system, wherein the system comprises:

a decapper, wherein the decapper is designed to remove a laboratory cap from a laboratory sample container containing a laboratory sample; and a laboratory apparatus according to claim 1.

23. The laboratory sample handling system according to claim 22, wherein the decapper is designed to drop the removed cap to the catcher.

* * * * *